United States Patent [19]
Sims

[11] Patent Number: 6,144,317
[45] Date of Patent: Nov. 7, 2000

[54] TRAFFIC SIGNAL WITH VISIBLE INDICATION IN A DIRECTION OTHER THAN DIRECT LINE OF SIGHT

[76] Inventor: Doug Sims, 14611 Badger Pass Way, Morgan Hill, Calif. 95037

[21] Appl. No.: 09/477,736

[22] Filed: Jan. 5, 2000

Related U.S. Application Data

[60] Provisional application No. 60/114,962, Jan. 5, 1999.

[51] Int. Cl.[7] .................................................. G08G 1/095
[52] U.S. Cl. ............... 340/907; 340/815.42; 340/815.66; 340/931; 362/231; 362/551; 362/582; 362/583
[58] Field of Search ..................... 340/907, 908, 340/931, 693.5, 691.1, 691.6, 815.42, 815.43, 815.65, 815.66; 362/551, 231, 582, 583

[56] References Cited

U.S. PATENT DOCUMENTS

| | | | |
|---|---|---|---|
| 3,761,706 | 9/1973 | Frey ........................................ | 240/8.41 |
| 5,276,594 | 1/1994 | Barkett et al. .......................... | 362/83.3 |
| 5,341,445 | 8/1994 | Davenport et al. ...................... | 385/39 |
| 5,664,863 | 9/1997 | Cassarly et al. ......................... | 362/32 |

*Primary Examiner*—Jeffery A. Hofsass
*Assistant Examiner*—Phung Nguyen
*Attorney, Agent, or Firm*—Rodger H. Flagg

[57] ABSTRACT

A light pipe is configured to pass light from a selected light source, such as the green, amber or red light on a traffic signal light to the left, right or rear of the traffic signal light to provide a visual indication of the selected traffic signal light from a remote location where the traffic signal light is not directly visible to the police officer monitoring compliance with traffic laws. The light pipe is secured to the traffic signal light housing by any conventional method, and does not interfere with the normal operation of the traffic signal light.

20 Claims, 3 Drawing Sheets

TRAFFIC SIGNAL WITH VISIBLE INDICATION IN A DIRECTION OTHER THAN DIRECT LINE OF SIGHT

This application claims the benefit of U.S. Provisional No. 60/114,962 filed Jan. 5, 1999.

BACKGROUND OF THE INVENTION

Traffic signal lights control traffic by use of a green light for "GO", an amber light for "CAUTION" and a red light for "STOP". Most traffic lights are directed at oncoming traffic, and some traffic lights even employ shields, so that the light from the traffic light cannot be easily seen by motorists traveling in alternate directions. This is done so that motorist traveling in alternate directions do not anticipate when a traffic light is about to change. Most traffic signal lights incorporate a momentary delay when cycling between stop and go, to allow motorists time to clear the intersection. Some motorists enter the intersection after the amber turns to red, in an attempt to pass through the intersection before cross traffic enters the intersection. This is a dangerous practice that leads to accidents, injury and sometimes death.

Police routinely monitor motorist compliance, to ensure safe driving practices. A patrol car must be positioned to view the traffic signal light, so that the patrolman can accurately determine compliance with traffic laws. Because the traffic light is only visible to oncoming traffic, the patrol car must be positioned to view the traffic signal light, which means the patrol car must pass through a red light to stop a motorists who runs a red light. This is dangerous, not only to the patrolman in the patrol car, but also to other motorists crossing the intersection with the green light. It is especially dangerous where the patrol car is parked, and must accelerate rapidly to catch the traffic violator.

Attempts have been made to signal the patrolman at a location other than in position to view the traffic signal from an oncoming position. This equipment has proven to be expensive to install and maintain.

Therefore, what is needed is an inexpensive means to allow a patrolman to monitor traffic signal activity from an adjacent road, or behind the traffic signal.

SUMMARY OF THE INVENTION

A light pipe is positioned with one end in alignment with the traffic signal light, and extends to one side or behind the traffic signal light. When the light is actuated, the light is visible through the light pipe from a distance to a remote location either to one side or behind the traffic signal light. Thus, a patrolman can determine when a traffic signal light changes, and safely stop a motorist who does not comply with safe driving practices. The light pipe may be in the form of a plastic rod or bar, fiber optic cable, etc. The light pipe may be secured to the traffic signal light by gluing, adhesive, brackets or other known means. The light pipe may be secured to a new or existing traffic signal light, and may be made to be easily removable for use in other locations.

Other objects and features of the present invention will become apparent from a consideration of the following description which proceeds with reference to the accompanying drawings, wherein example embodiments of the invention are selected by way of illustration and not by way of restriction.

DETAILED DESCRIPTION OF THE DRAWINGS

DETAILED DESCRIPTION OF THE PREFERRED EMBODIMENTS

Figure 1:
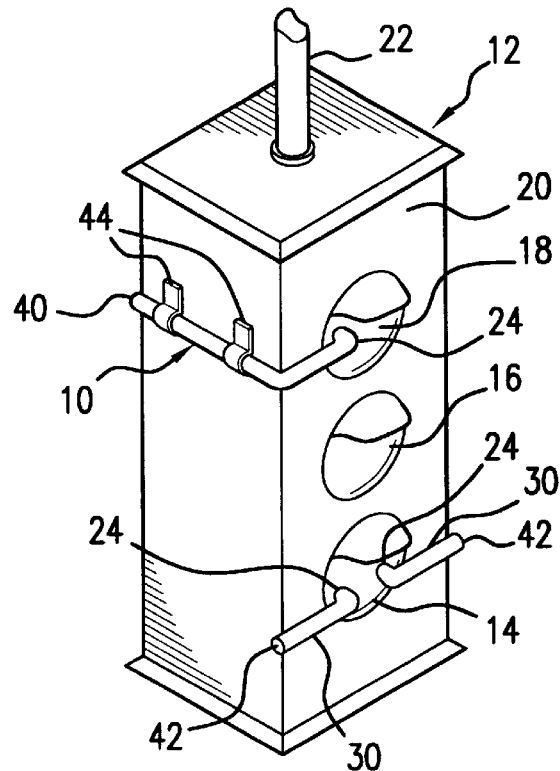
FIG. 1 is a perspective view of a traffic signal light, with a light pipe attached.

Referring to FIG. 1, the light pipe 10 is secured by any conventional means, such as by adhesive, adhesive tape, bracket, hook and loop type fastening means, etc. to a conventional traffic signal light 12. The traffic signal light 12 typically has a green light 14 for "GO", an amber light 16 for "CAUTION", and a red light 18 for "STOP". Some traffic signal lights 12 also include a turn signal indicator (not shown).

A traffic signal light housing 20 preferably a waterproof enclosure, which encloses the electrical components to selectively actuate the lights 14, 16, 18. Control of the actuation of the traffic signal lights 14, 16, 18 may be provided at a remote location (not shown). Current passes through a suitable insulated electrical cable 22, to the electrical components located within the traffic signal light 12. The traffic signal light 12 is usually supported in position by an overhead cable, traffic light pole, cross support, or other known means.

The traffic light signal 12 usually includes a momentary delay between traffic light signals positioned for use in one direction, and traffic light signals positioned for use in another direction, such as for cross traffic, turning traffic, etc. This allows traffic to clear the intersection before the cross traffic, or turning traffic enters the intersection.

The light pipe 10 disclosed herein, is light transmissive, and may be positioned to indicate the actuation of the green light 14, the caution light 16 or the red light 18, to suit the intersection and the needs of the police department. Of course, it is within the scope of this invention to secure multiple light pipes 10 to indicate all three lights 14, 16, 18.

Figure 2:
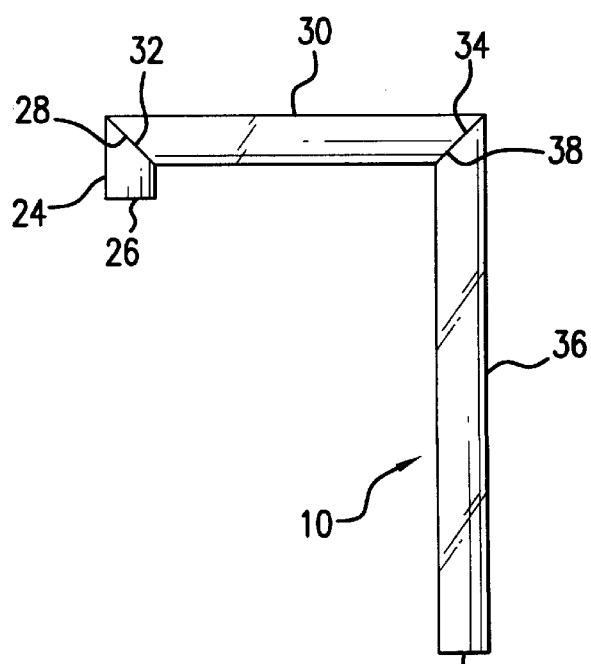
FIG. 2 is a top view of the traffic signal light shown in FIG. 1, wherein the light pipe is positioned to signal a patrolman to the rear of the traffic signal light.
Figure 3:
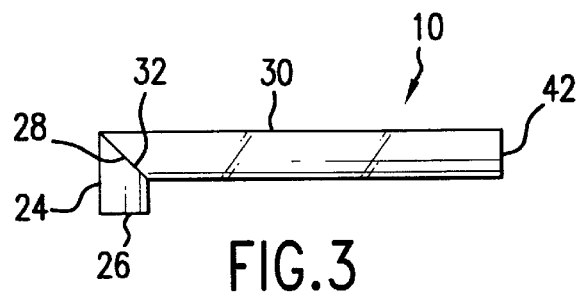
FIG. 3 is a top view of the traffic signal light shown in FIG. 1, wherein the light pipe is positioned to signal a patrolman to the left of the traffic signal light.
Figure 4:
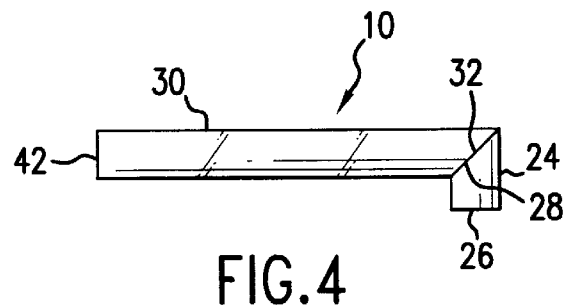
FIG. 4 is a top view of the traffic signal light shown in FIG. 1, wherein the light pipe is positioned to signal a patrolman to the right of the traffic signal light.

The light pipe 10 may be configured as shown in FIG. 2, to signal the light condition to the rear of the traffic signal light 12. Alternately, the light pipe 10 may be configured as shown in FIG. 3, to signal the light condition to the left side of the traffic signal light 12. The light pipe 10 may also be positioned to signal the light condition to the right side of the traffic signal light 12, as shown in FIG. 4, by inverting the light pipe 10 shown in FIG. 3.

Figure 5:
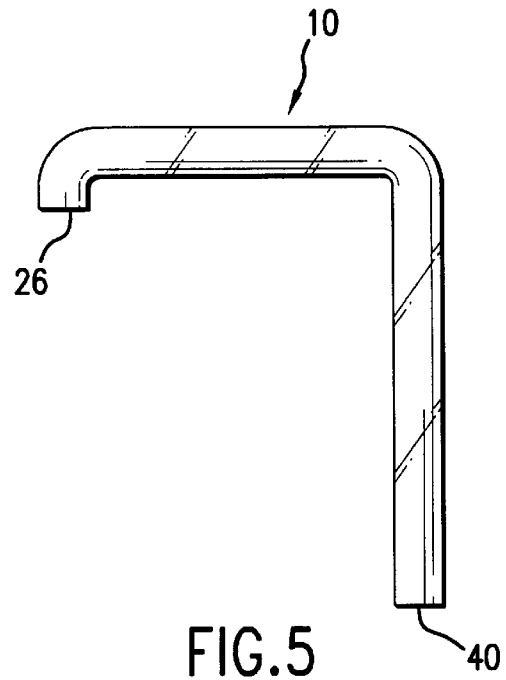
FIG. 5 is a cross-sectional view of a light pipe as shown in FIG. 2, wherein the light pipe is made from a plastic rod.

FIG. 5 is a cross-sectional view of the light pipe 10 shown in FIG. 2, wherein the light pipe 10 is made of a plastic rod which is cut and glued together into the desired configuration. As shown in FIG. 5, the light pipe 10 has a first rod portion 24 having a first distal end 26 positioned to face a selected one of the lights 14, 16, 18. The first rod portion 24 has a second angled end 28 located on the end opposite the first distal end 26.

A second rod portion 30 has a third angled end 32 which abuts the second angled end 28 of the first rod portion 24. The combined angle of the second angled end 28 of the first rod portion 24 and the third angled end 32 of the second rod portion 30 preferably is ninety degrees, plus or minus five degrees. The second angled end 28 of the first rod portion 24 is preferably secured to the third angled end 32 of the second rod portion 30 by gluing, bonding, etc. Other means of securement may also be used, such as ultrasonic welding, thermal welding, laser welding, etc.

A third rod portion 36 has a fifth angled end 38 which is secured to the fourth angled end 34 of the second rod portion 30 by gluing, bonding, etc. Preferably, the combined angle of the fourth angled end 34 of the second rod portion 30 and the fifth angled end 38 of the third rod portion 36 is ninety degrees, plus or minus five degrees.

The second rod portion is sized to extend beyond the side of the traffic signal light housing 20. The third rod portion is sized to preferably extend to the rear of the traffic signal light housing 20. The third rod portion has a sixth distal end 40.

Light from the selected light 14, 16, 18 passes through the first rod portion 24 to the second rod portion 30, and through the second rod portion to the third rod portion 36. The light is substantially entrapped within the profile of the first, second and third light portions 24, 30, 36, and is visible from a distance as the light passes through the sixth distal end 40.

The light pipe 10 is made of a light transmissive material, such as plastic or glass. Of course, the light pipe 10 may be molded, formed or shaped to the desired configuration, rather than cut and glued together as previously noted.

The outer surface of the first rod portion 24, the second rod portion 30 and the third rod portion 36 may be treated with pigment or a reflective surface coating, to suit the type of material used. However, in tests of this invention, it has been found that untreated plastic rod may be successfully used, which has the advantage of minimizing costs. Maintenance is minimized, as the light pipe is plastic or glass, and thus will not corrode when exposed to the weather.

Preferably, the distal ends 26, 40, 42 are polished or otherwise treated to ensure transmission of light into and out of the light pipe, in any manner known in the art. Likewise, any internal cut portions are also polished or otherwise treated at assembly. Where the light pipe 10 is bent to shape or formed to shape, the internal cut portions are eliminated.

Figure 6:
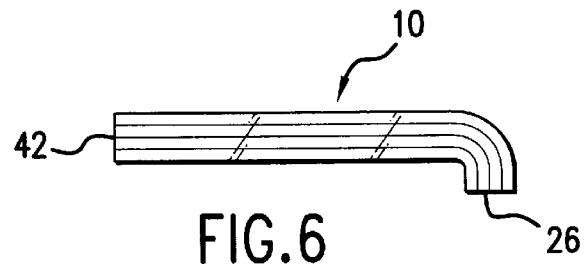
FIG. 6 is a cross-sectional view of a light pipe as shown in FIG. 3, wherein the light pipe is made from fiber optic cable.

FIG. 6 is a cross sectional view of FIG. 3, wherein the light pipe 10 is positioned to signal the selected light condition 14, 16, 18 to the side of the traffic signal light 12. This configuration may be used to signal to either the left side or the right side of the traffic signal light 12, depending upon how the light pipe 10 is mounted to the traffic signal light housing 20.

As shown in FIG. 6, the light pipe 10 comprises a first rod portion 24 having a first distal end 26 and a second angled end 28. A second rod portion 30 has a third angled end secured to the second angled end 28 of the first rod portion 24. The combined angle of the second angled end 28 and the third angled end 28 is preferably ninety degrees, plus or minus five degrees. The means of securement may be any known means, as previously noted. In this embodiment, the second rod portion 30 has a distal end 42, which preferably extends to the side of the traffic signal light housing 20.

Where fiber optic cable 44 is used in place of first, second and/or third rod portions 24, 30, 36, the fiber optic cable 44 may be flexed to conform to the configuration of the traffic signal light housing 20.

The light pipe 10 may be secured to the traffic signal light housing 20 by any known means, including gluing, bonding, taping, bracketing, hook and loop fastening means, etc. Preferably, the light pipe 10 is secured to the traffic signal light housing 20 without penetrating the traffic signal light housing 20, so that the water proof housing is not compromised.

Figure 7A:
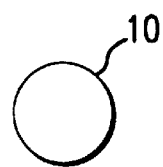
FIG. 7A through FIG. 7E show various cross sectional configurations of the light pipe shown in FIG. 1.
Figure 7B:
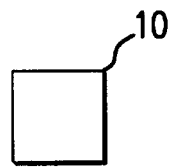
Figure 7C:
Figure 7D:
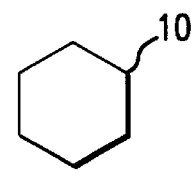
Figure 7E:
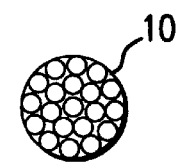

The cross-sectional profile of the light pipe 10 may be round or oval as shown in FIG. 7A; square or rectangular as shown in FIG. 7B; triangular as shown in FIG. 7C; multi-sided as shown in FIG. 7D; or may be comprised of multiple light pipe elements as shown in FIG. 7E.

Multiple light pipes 10 may be secured to the traffic signal light housing 20 in alignment with selected lights 14, 16, 18, to suit the needs of the police, the location of the traffic signal light 12, and the availability of parking for a patrol car, etc.

Thus, while the present invention has been illustrated and described in connection with certain example embodiments, it will be understood that the embodiments disclosed herein are selective and exemplary of the invention, and are not intended to be restrictive thereof. It is reasonably expected that one of average skill in the art may make numerous revisions and adaptations of the invention in light of this disclosure, and it is intended that such revisions and adaptations be construed as being within the limits and scope of the accompanying claims.

I claim:

1. A traffic signal alert apparatus for monitoring the condition of an existing traffic signal light from a non-direct viewing location, comprising:

a) said existing traffic signal light having a housing with a front side, a first side, a second side, a rear side, a top side and a bottom side, said existing traffic signal light further having a go light, a caution light and a stop light positioned on said front side of said existing traffic signal light housing;

b) a first light transmissive rod having a first distal end positioned to face a selected one of a go light, a caution light and a stop light, said first light transmissive rod extending to a second angled end;

c) a second light transmissive rod having a third angled end secured to the second angled end of the first light transmissive rod, forming a substantially right angled connection there-between, said second light transmissive rod having a fourth distal end positioned for remote viewing from one of said first side and said second side of said existing traffic signal light;

d) said traffic signal alert apparatus secured to said existing traffic signal light housing; and e) wherein the first distal end and the second angled end of the first light transmissive rod and the third angled end and the fourth distal end of the second light transmissive rod are treated to ensure transmission of light through the first and second light transmissive rods.

2. The traffic signal alert apparatus of claim 1, wherein the fourth distal end of said second light transmissive rod is angled to extend beyond said one of said first side and said second side of said existing traffic light; and a third light transmissive rod has a fifth angled end secured to said fourth angled end of said second light transmissive rod; said third light transmissive rod also has a sixth distal end positioned in proximity to a rear side of said existing traffic light signal for remote viewing.

3. The traffic signal alert apparatus of claim 1, wherein the first light transmissive rod and the second light transmissive rod are formed into a substantially right angle from a single light pipe for viewing from one of said first side and said second side of said existing traffic light housing.

4. The traffic signal alert apparatus of claim 2, wherein a single light pipe is formed to have a first distal end facing a selected traffic light, a first right angle bend, a first straight portion extending substantially parallel to said front side of said existing traffic light housing, a second right angle bend and a second straight portion extending substantially parallel to one of said first side and said second side of said existing traffic light housing; and a second distal end positioned for viewing from said rear side of said existing traffic light housing.

5. The traffic signal alert apparatus of claim 4, wherein a plurality of light fibers are aligned to form said single light pipe.

6. The traffic signal alert apparatus of claim 1, wherein the said traffic signal alert apparatus is secured to said existing traffic signal light without penetrating said existing traffic signal light housing.

7. The traffic signal alert apparatus of claim 1, wherein the cross-sectional profile of said light transmissive rod is selected to be one of round, oval, square, rectangular, triangular and multi-sided.

8. The traffic signal alert apparatus of claim 1, wherein the outer surface of said light pipe is treated with an internal reflective coating.

9. The traffic signal alert apparatus of claim 1, wherein the light pipe is made from one of plastic and glass.

10. A traffic signal alert apparatus for monitoring the condition of an existing traffic signal light from a non-direct viewing location, comprising:
   a) said existing traffic signal light having a housing with a front side, a first side, a second side, a rear side, a top side and a bottom side; said existing traffic signal light further having a go light, a caution light and a stop light positioned on said front side of said existing traffic signal light housing;
   b) a first light transmissive rod having a first distal end positioned to face a selected one of the go light, the caution light and the stop light, said first light transmissive rod extending to a second angled end;
   c) a second light transmissive rod having a third angled end secured to the second angled end of the first light transmissive rod, forming a substantially right angled connection there-between, said second light transmissive rod having a fourth angled end;
   d) a third light transmissive rod having a fifth angled end secured to said fourth angled end of said second light transmissive rod; said third light transmissive rod also having a sixth distal end positioned in proximity to a rear side of said existing traffic light signal housing for remote viewing;
   d) said traffic signal alert apparatus secured to said existing traffic signal light; and
   e) wherein the first distal end and the second angled end of the first light transmissive rod, the third angled end and the fourth angled end of the second light transmissive rod, and the fifth angled end and the sixth distal end of the third light transmissive rod are treated to ensure transmission of light through the first, second and third light transmissive rods.

11. The traffic signal alert apparatus of claim 10, wherein the first light transmissive rod, the second light transmissive rod, and the third light transmissive rod are formed from a single light pipe for viewing from said back side of said existing traffic light housing.

12. The traffic signal alert apparatus of claim 11, wherein a plurality of light fibers are aligned to form said single light pipe.

13. The traffic signal alert apparatus of claim 10, wherein the said traffic signal alert apparatus is secured to said existing traffic signal light without penetrating said existing traffic signal light housing.

14. The traffic signal alert apparatus of claim 10, wherein the cross-sectional profile of said light transmissive rod is selected to be one of round, oval, square, rectangular, triangular and multi-sided.

15. The traffic signal alert apparatus of claim 10, wherein the outer surface of said light pipe is treated with an internal reflective coating.

16. The traffic signal alert apparatus of claim 10, wherein the light pipe is made from material selected from one of plastic and glass.

17. A traffic signal alert apparatus for monitoring the condition of an existing traffic signal light from a non-direct viewing location, comprising:
   a) said existing traffic signal light having a housing with a front side, a first side, a second side, a rear side, a top side and a bottom side, said existing traffic signal light further having a go light, a caution light and a stop light positioned on said front side of said existing traffic signal light housing;
   b) A first traffic signal alert apparatus aligned with said go light, said first traffic signal alert apparatus having a first light transmissive rod with a first distal end positioned to face said go light on said front side of said existing traffic signal light, said first light transmissive rod extending to a second angled end; a second light transmissive rod having a third angled end secured to the second angled end of the first light transmissive rod, forming a substantially right angled connection there-between, said second light transmissive rod having a fourth distal end positioned for remote viewing from one of said first side and said second side of said existing traffic signal light;
   c) a second traffic signal alert apparatus aligned with said caution light, said second traffic signal alert apparatus having a first light transmissive rod with a first distal end positioned to face said go light on said front side of said existing traffic signal light, said first light transmissive rod extending to a second angled end; a second light transmissive rod having a third angled end secured to the second angled end of the first light transmissive rod, forming a substantially right angled connection there-between, said second light transmissive rod having a fourth distal end positioned for remote viewing from one of said first side and said second side of said existing traffic signal light;
   d) a third traffic signal alert apparatus aligned with said stop light, said third traffic signal alert apparatus having a first light transmissive rod with a first distal end positioned to face said go light on said front side of said existing traffic signal light, said first light transmissive rod extending to a second angled end; a second light transmissive rod having a third angled end secured to the second angled end of the first light transmissive rod, forming a substantially right angled connection there-between, said second light transmissive rod having a fourth distal end positioned for remote viewing from one of said first side and said second side of said existing traffic signal light; and
   e) said first traffic signal alert apparatus, said second traffic signal alert apparatus and said third traffic signal alert apparatus are secured to said existing traffic signal light.

18. The traffic signal alert apparatus of claim 17, wherein each of first, second and third traffic signal alert apparatus each have the fourth distal ends of each of said second light transmissive rod angled to extend beyond said one of said first side and said second side of said existing traffic light; and wherein each of the first, second and third traffic signal alert apparatus have a third light transmissive rod with a fifth angled end secured to said fourth angled end of said second light transmissive rod, with each of said third light transmissive rod also having a sixth distal end positioned in proximity to a rear side of said existing traffic light signal for remote viewing of the respective go light, the respective caution light and the respective stop light.

19. The traffic signal alert apparatus of claim 17, wherein first traffic signal alert apparatus, the second traffic signal alert apparatus and the third traffic signal alert apparatus each are individually formed into a substantially right angle from a single light pipe for viewing from one of said first side and said second side of said existing traffic light housing.

20. The traffic signal alert apparatus of claim 17, wherein the first traffic signal alert apparatus, the second traffic signal alert apparatus and the third traffic signal alert apparatus of claim 18, are each individually formed from a single light pipe having a first distal end facing a selected traffic light, a first right angle bend, a first straight portion extending substantially parallel to said front side of said existing traffic signal housing, a second right angle bend and a second straight portion extending substantially parallel to one of said first side and said second side of said existing traffic signal housing; and a second distal end positioned for viewing from said rear side of said existing traffic light housing.

* * * * *